United States Patent Office 3,490,795
Patented Jan. 20, 1970

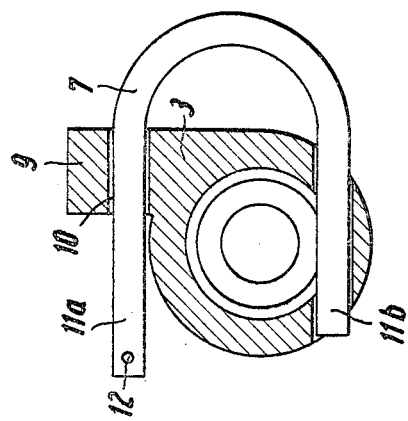
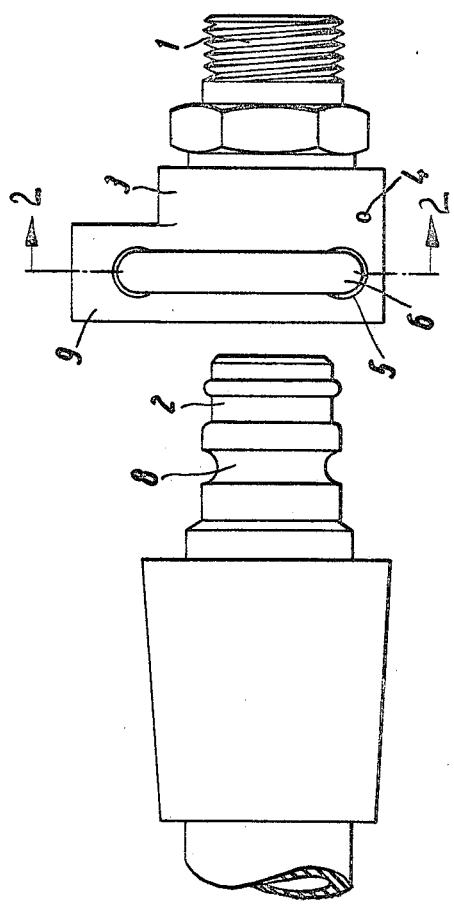

3,490,795
MEANS FOR RELEASABLE AND SEALABLE JOINING PIPES, PARTICULARLY HIGH PRESSURE LINES, WITH EACH OTHER OR WITH CONNECTOR PLUGS
Gunther Hennlich, 17 Am Beul, 432 Hattingen (Ruhr), Germany
Filed Sept. 11, 1967, Ser. No. 666,681
Claims priority, application Germany, Oct. 15, 1966 (utility model), H 56,855; Oct. 28, 1966 (utility model), H 56,967
Int. Cl. F16l 37/00
U.S. Cl. 285—305
5 Claims

ABSTRACT OF THE DISCLOSURE

An apparatus for releasably and sealingly joining pipes, in particular high pressure pipes, together or with connecting joints, which comprises a connection having a central recess, and a counter connection received at least partly in the connection. The connection constitutes a part of a first pipe, and the counter connection constitutes part of a second pipe. One of the connections has an annular groove, and the other of the connections has at least one tangentially disposed bore. A bracket-like safety pin is provided and a screw collar ring surrounds the connection and the counter connection. The bracket-like safety pin engages the ring, and prevents the disconnection of the pipes, as well as enters the annular groove. The latter is formed as a semi-circular to a segment face and the at least one tangentially disposed bore is arranged such, that it complements the passing face of the annular groove to a cylindrical bore. The bracket-like safety pin comprises a U-shaped clamp strap having two arms of different lengths. The shorter of the arms projects through the bore, and the longer of the arms is displaceably received in another bore with safety means against complete detachment and has a recess freeing the annular groove in the counter connection.

The present invention relates to a means for the releasable sealing of pipes, particularly high pressure pipes, with each other or with connector plugs.

The present invention is intended to be used particularly in the mining industry in underground workings. In order to connect the pressure hoses or pipes with each other, so-called quick-coupling devices are used, which have a connection piece on one end of the pipe and a counter connection piece on the other end of the pipe; these pieces are inserted into each other when coupling and are connected to each other by a screw collar ring. Thereby a bracket-like safety pin is provided which prevents the joined parts from separating and which engages into an annular groove of the counter connection piece and into one or two tangentially extending bores in the screw collar ring, whereby a seal is provided between both coupling portions. The safety pin formerly used therefor, was a clamp strap with a square cross-section and arms of equal length. The seal provided only acts radially and is not protected against wear and is not adjustable.

Furthermore, there is no safety device against a complete detachment and against loss of the clamp strap. In another embodiment there is provided a pivotable safety pin with recesses whose cross-section is reduced in one place in such a manner that the connection can be released by a turn of 90°. Such safety devices have the same drawbacks as hereinbefore described and in addition thereto, they are difficult to produce and hence expensive.

It is one object of the present invention to provide a means for the releasable sealing of pipes, particularly high pressure pipes, with each other or with connector plugs, which amounts to a quick coupling device for pressure lines, which overcomes the described drawbacks and operates simply and safely and has an undetachably mounted safety strap.

It is another object of the present invention to provide a means for the releasable sealing of pipes, particularly high pressure pipes, with each other or with connector plugs, wherein an annular groove is formed in the counter connection piece by a semi-circular or by a circular segmental area while the one or both tangentially extending bores in the screw collar ring are arranged in such a manner that they make the passage area of the annular groove into a cylindrical bore. It is a particular advantage if the screw collar ring is provided on one side with a cam-like projection commencing from the outer circumference, which is centrally or eccentrically arranged and which, by a recess, perforation or the like, is penetrated for the safety pin parallel to the tangential bore. The safety pin is a U-shaped clamp strap and has two arms of different lengths, the shorter one of which crosses the bore extending tangentially to the inner circumference of the screw collar ring and the annular groove in the counter connection piece, while the longer arm is guided in the bore of the cam-like projection and is provided with a safety catch to prevent complete detachment. The recess, perforation or the like, penetrating the cam-like projection is formed by a cylindrical bore. It is of particular advantage if the two arms of the U-shaped clamp strap narrow slightly, so that the arms have to be slightly pressed apart when pressing in or releasing the clamp strap, so that a locking effect or a catching occurs in the end positions.

The gasket may be formed by a seal, e.g., a packing washer, which is to be clamped between the two connection pieces. The recesses, perforations or the like, provided in the screw collar ring and in the counter connection piece, are displaced against each other in such a manner that the insertion of the safety pin, which crosses both connection parts, causes an axial pressure on the two portions which are to be coupled by the safety pin. The safety pin is cylindrical or conical. It has the shape of a U-shaped clamp strap and has equal or different long arms, which again may be cylindrical or conical.

It is of special advantage to design the safety pin as a U-shaped clamp strap with two arms of different length, whereby a recess is provided in one of the arms which releases the annular groove.

With these and other objects in view, which will become apparent in the following detailed description, the present invention will be clearly understood in connection with the accompanying drawings, in which:

FIGURE 1 is an elevational exploded view of the separate coupling portions;

FIG. 2 is a section of the screw collar ring of the coupling along the lines 2—2 of FIG. 1;

Figure 3:
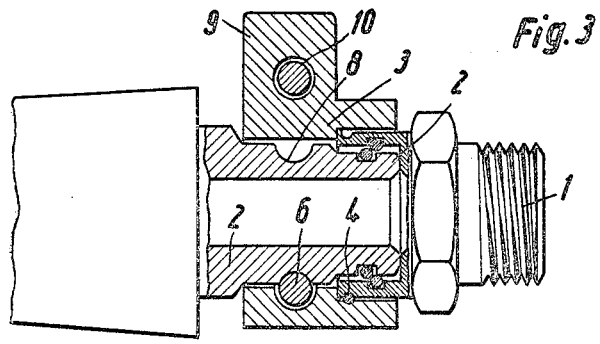
FIG. 3 is an elevation and partly a section through the fitted coupling.

Referring now to the drawings, the quick coupling device comprises a connection 1 and a counter connection 2, which are connected to each other by means of a screw collar ring 3, which is rotatably mounted on the connection by means of a shoulder wire 4. In the screw collar ring 3 are provided recesses, perforations or the like 5, which receive a safety pin 6, which may be designed as a U-shaped clamp strap 7. In the counter connection 2 there is provided an annular groove 8 which is located opposite to the perforations, recesses or the like 5 and which is either displaced or not displaced depending whether the seal is to be axially or radially clamped. The screw collar ring 3 has a cam-like projection 9 on its outer circumference, which is located centrally or eccentrically and has a bore 10 extending tangentially to the circumference. The U-shaped clamp strap 7 has two cylindrical arms 11a and 11b. The latter may be of equal or different length. In the case of different length, the longer arm 11a extends through the bore 10 of the cam-like projection 9 and is there movably mounted against complete detachment by means of a safety means 12, such as a safety pin. The distance of the two arms 11a and 11b of the U-shaped clamp strap 7 on the corresponding opposite places decreases towards the ends of the arms. Hence a locking effect occurs when pressing in or releasing the clamp strap 7, which simplifies the operation of the quick coupling device.

Figure 4:
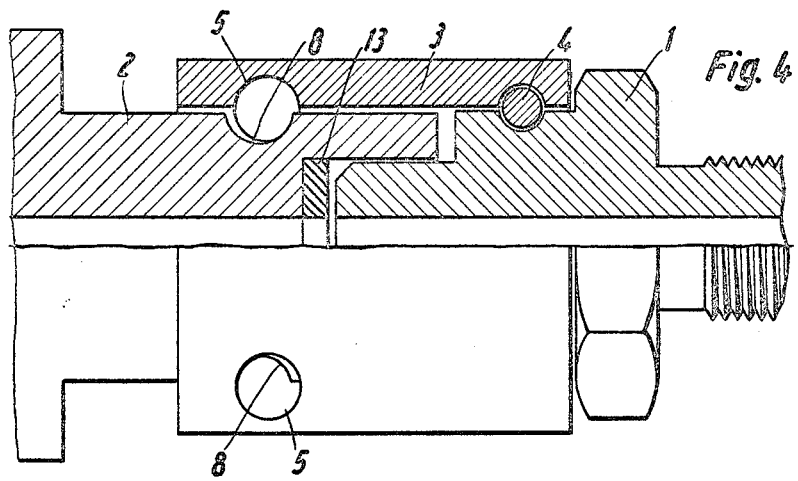
FIG. 4 is an elevation, partly in section, of the coupling with the seal according to FIG. 6, which is to be axially clamped.
Figure 5:
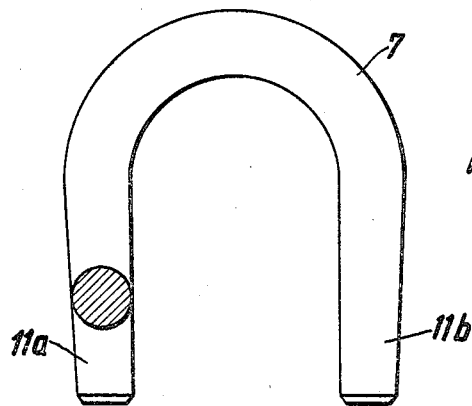
FIG. 5 is an elevation of the clamp strap with conical arms as example.
Figure 6:
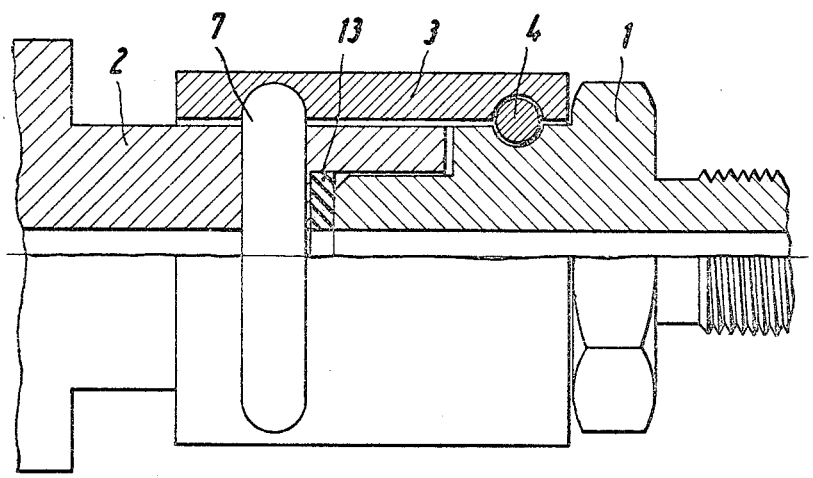
FIG. 6 is an elevation, partly in section, of the quick coupling device in clamped condition.
Figure 7:
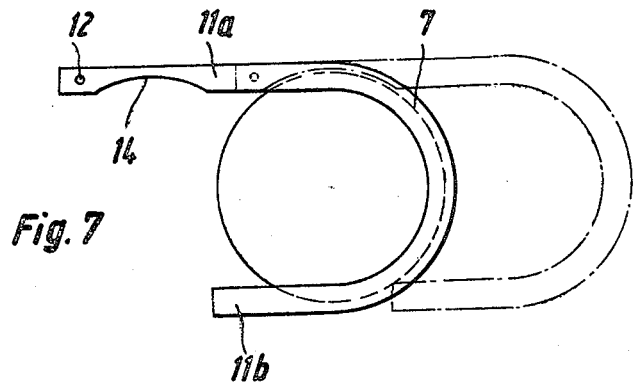
FIG. 7 is an elevation of the undetachable clamp strap of the seal which is to be axially clamped.

In the embodiment illustrated in FIG. 4, having a seal, e.g. a packing washer 13, which is to be axially clamped, the annular groove 8 in the counter connection 2 and the perforations 5 in the screw collar ring 3 are axially displaced against each other. Connection 1 and counter connection 2 are fitted into each other by hand. The insertion of the safety pin, clamp strap or the like 7, into the axially displaced recess 5 causes the parts, which are to be coupled, to be pressed onto each other. Hence the seal or packing washer 13 is tightened depending on the requirements of the pressure to be sealed and on the condition of the packing washer 13. It is especially advantageous to design the safety pin as a clamp strap as illustrated in FIG. 7. On the longer arm 11a of the clamp strap 7 there is a catch, such as a safety means 12, which prevents complete detachment. In the release condition, a recess 14, provided in the longer arm 11a, frees the annular groove 8 in the counter connection 2.

While I have disclosed several embodiments of the present invention, it is to be understood that these embodiments are given by example only and not in a limiting sense.

I claim:
1. An apparatus for releasably and sealingly joining pipes, in particularly high pressure pipes, together or with connecting joints, comprising
   a connection having a central recess,
   a counter connection received at least partly in said connection,
   said connection constituting a part of a first pipe,
   said counter connection constituting part of a second pipe,
   one of said connections having an annular groove,
   a screw collar ring operatively joined to the other of said connections and surrounding said connection and said counter connection and having therein at least one tangentially disposed bore tangential to said annular groove,
   a bracket-like safety pin engaging said screw collar ring disposed in said at least one tangentially disposed bore and entering said annular groove thereby preventing the disconnection of said screw collar ring and said one of said connections,
   said annular groove being formed as a semi-circular to a segment face of said at least one tangentially disposed bore being arranged such, that it complements the passing face of said annular groove to a cylindrical bore,
   said bracket-like safety pin comprising a U-shaped clamp strap having two arms of different lengths,
   the shorter of said arms projecting through said at least one tangentially disposed bore,
   said screw collar ring having another bore,
   the longer of said arms being displaceably received in said another bore, and
   safety means for preventing said U-shaped clamp strap against complete detachment from said screw collar ring when said shorter of said arms is at a position withdrawn from engagement with said annular groove.

2. The apparatus, as set forth in claim 1, wherein the distance between said two arms of said U-shaped clamp strap decreases towards the extremities at the corresponding opposite points relative to each other, so that upon pushing in and release of said U-shaped clamp strap a hooking effect is brought about in the end positions.

3. The apparatus, as set forth in claim 1, wherein said longer of said arms of said U-shaped clamp strap is mounted spaced from said annular groove in said screw collar ring, so that it does not pass through said annular groove.

4. The apparatus, as set forth in claim 1, wherein said screw collar ring has on the side opposite said at least one tangentially disposed bore a projection, in which said another bore is disposed parallel to said at least one tangentialy disposed bore for the mounting of said long arm of said U-shaped clamp strap.

5. The apparatus, as set forth in claim 1, wherein said another bore is tangential to said annular groove and includes a substantially semi-circular surface directly facing a portion of said annular groove, and said longer of said arms having a recess for freeing said annular groove from said longer of said arms when said U-shaped clamp strap is positioned so that said recess is directly facing said annular groove when said shorter of said arms is at a position withdrawn from engagement with said annular groove.

References Cited

UNITED STATES PATENTS

| 1,019,000 | 2/1912 | Watson | 285—305 X |
| 2,597,482 | 5/1952 | Harrison et al. | 285—305 |

FOREIGN PATENTS

| 26,764 | 7/1914 | Great Britain. |
| 902,447 | 8/1962 | Great Britain. |
| 941,545 | 11/1963 | Great Britain. |
| 1,030,535 | 5/1966 | Great Britain. |
| 643,295 | 4/1937 | Germany. |
| 844,214 | 4/1939 | France. |

DAVID J. WILLIAMOWSKY, Primary Examiner

D. W. AROLA, Assistant Examiner